United States Patent
Van De Stroet et al.

(10) Patent No.: US 12,065,807 B2
(45) Date of Patent: Aug. 20, 2024

(54) ANTI-STALL SYSTEM FOR OPEN CIRCUIT SYSTEMS

(71) Applicant: Danfoss Power Solutions Inc., Ames, IA (US)

(72) Inventors: Caleb Van De Stroet, Nordborg (DK); Austin Hansell, Nordborg (DK)

(73) Assignee: Danfoss Power Solutions Inc., Ames, IA (US)

( * ) Notice: Subject to any disclaimer, the term of this patent is extended or adjusted under 35 U.S.C. 154(b) by 423 days.

(21) Appl. No.: 17/368,979

(22) Filed: Jul. 7, 2021

(65) Prior Publication Data
US 2022/0010528 A1   Jan. 13, 2022

Related U.S. Application Data

(60) Provisional application No. 63/048,697, filed on Jul. 7, 2020.

(51) Int. Cl.
| | |
|---|---|
| *E02F 9/22* | (2006.01) |
| *F02B 63/06* | (2006.01) |
| *F02D 29/04* | (2006.01) |
| *F15B 20/00* | (2006.01) |
| *E02F 9/20* | (2006.01) |

(52) U.S. Cl.
CPC ............ *E02F 9/2246* (2013.01); *F02B 63/06* (2013.01); *F02D 29/04* (2013.01); *F15B 20/00* (2013.01); *E02F 9/2066* (2013.01); *F02D 2200/101* (2013.01); *F15B 2211/20523* (2013.01)

(58) Field of Classification Search
CPC ........ F02F 9/2246; F02B 63/06; F02D 29/04; F02D 2200/101; F15B 20/00; F15B 2211/20523; E02F 9/2066

USPC .......................................................... 701/102
See application file for complete search history.

(56) References Cited

U.S. PATENT DOCUMENTS

| | | | | |
|---|---|---|---|---|
| 7,797,092 | B2 * | 9/2010 | Schifferer | ............. F04B 49/065 |
| | | | | 701/50 |
| 2011/0264335 | A1 * | 10/2011 | Zhao | ......................... B66F 9/22 |
| | | | | 701/50 |
| 2019/0071172 | A1 * | 3/2019 | Caldwell | ................. B64C 27/64 |

* cited by examiner

*Primary Examiner* — Hung Q Nguyen
*Assistant Examiner* — Anthony Donald Taylor, Jr.
(74) *Attorney, Agent, or Firm* — ZarleyConley PLC

(57) ABSTRACT

An anti-stall system to prevent an engine, particularly a low-powered engine, from stalling when encountering a load that the machine is capable of overcoming but due to the nature of the engine, the load encounter would result in a stall. The system includes a hydraulic system in communication with a control system that has one or more sensors that detect, determine, and/or transmit an operational variable. The control system further comprises a plurality of anti-stall blocks having unique configurations, including a first configured to limit output flow upon determination of an engine droop, a second configured to limit output flow based on available engine torque, a third configured to limit output pressure upon rapid engine droop detection, and a fourth configured to prioritize and share output flow between the machine functions. The anti-stall blocks provide for complementary and cooperative configuration to prevent a stall from occurring based on responses to the detection and determination of various dynamic and continuous operational variables in real-time or near real-time with operational parameters.

21 Claims, 8 Drawing Sheets

ANTI-STALL SYSTEM FOR OPEN CIRCUIT SYSTEMS

CROSS REFERENCE TO RELATED APPLICATION

This application claims the benefit of U.S. Provisional Application No. 63/048,697 filed Jul. 7, 2020, the contents of this application is hereby incorporated by reference in its entirety.

BACKGROUND OF THE INVENTION

This disclosure generally relates to an anti-stall system. More specifically, the disclosure relates to an anti-stall system for open circuit hydraulic systems, and in particular, low powered engines.

The use of low-power engines with a hydraulic system is well-known in the art and are used in a variety of machines, including by way of example a skid loader. In order to provide maximum capacity, such engines commonly operate within a hydraulic system that has a higher installed hydraulic capacity than the engine is capable of supplying power for.

During operation, low-power engines run at a particular speed to provide and produce torque. Engines of this type operate with a hydraulic system at a low pressure and high flow, or at a high pressure and low flow, in order to not overwhelm the engine with high torque load that can result in engine stalling. The high torque load on the engine is a result of high hydraulic pressure and high pump flow.

In modern machines, an electronic control unit (ECU) using a single proportional-integral derivative (PID) control is used to reduce the occurrences of stalls by controlling flow output based on a determined engine droop. The nature of PID control is a reactive process, which has an inherent inability to prevent stalls from occurring in many instances. This is made worse by slow hydraulic transmission response, inadequate engine inertia and not returning kinetic energy back into the engine that is recovered during braking. Due to the slow hydraulic response, the PID can be inadequate in reducing system oscillations.

Although other anti-stall systems exist, problems persist. For instance, closed-loop pumps sometimes utilize a non-feedback, proportional hydraulic (NFPH) control that is a hydraulic proportional control in which an input pressure signal directly control the pump to achieve a desired pump displacement. NFPH, however, cannot prevent a stall from occurring but rather can only limit the occurrences of stalls. NFPH solutions are also limited in application to closed-loop pumps that can be expensive to implement.

Another alternative is implementing an engine torque limiting system, but this system requires numerous parts that result in high manufacturing costs.

Thus, it is a primary aspect of this disclosure to provide an anti-stall system that improves upon the art.

Another aspect of this disclosure is to provide an anti-stall system that prevents an engine stall to occur due to a reaction to the load that a hydraulic system is capable of overcoming.

Yet another aspect of this disclosure is to provide an anti-stall system that utilizes multiple valve and pressure pump commands to prevent a stall.

Another aspect of this disclosure is to provide an anti-stall system that modifies output flow and pressure to prevent a stall.

Yet another aspect of this disclosure is to provide an anti-stall system that prevents a stall both proactively and reactively.

Another aspect of this disclosure is to provide an anti-stall system that prevents engine stall, not simply limits engine stall occurrence.

Yet another aspect of this disclosure is to provide an anti-stall system that increases machine performance, productivity, efficiency, and stability.

Another aspect of this disclosure is to provide an anti-stall system that results in easier machine operation.

These and other aspects, features, and advantages of the invention will become apparent from the specification and claims.

SUMMARY OF THE INVENTION

Low-powered engines, such engines are commonly used in smaller machines in order to maintain lower costs and few parts for potential fault. Similarly, low-powered engines are typically mechanically controlled and cannot be issued direct commands for operation from a control system as is the case with electronic controlled engines. Likewise, the mechanical nature shrouds specific operational variables during operation. As a result, such engines are easily stalled, especially by inexperienced operators. This is due to the engine only being capable of providing so much power (speed or torque) and when coupled with a hydraulic system that can readily request too much torque the engine droops and a stall occurs.

The disclosure provides various aspects of an anti-stall system. In one aspect of the disclosure, broadly described herein a plurality of anti-stall blocks which comprise algorithms and/or a series of instructions carried out by a control system to cooperatively and complementarily prevent engine stall based on the operational parameters and the operational variables in a continuous and dynamic manner, such that modifications to the flow and pressure of the anti-stall system occur in real-time or near-real time. The present disclosure is configured for use with low-powered engines that are mechanically controlled and that would otherwise commonly suffer the listed disadvantages, among others. In doing so, the anti-stall system functions with the use of a limited number of sensors (e.g., a load sensing pressure sensor and an engine speed sensor).

In another aspect, broadly described herein an engine set speed determination provides for establishing a set speed of an engine in order to prevent an engine stall. In conventional systems, a PID operates from a detected engine set speed without considering numerous operational parameters and operational variables. The engine set speed determination of the present invention is accomplished using a minimal number of sensors, including a pressure sensor and engine speed sensor, but is otherwise determined using operational variables, including commands, and operational parameters, such as a torque curve. The engine set speed determination determines a set speed for the engine. The set speed is a determined engine speed value which acts as a target value for the engine speed in the operation of the anti-stall system. In other words, the anti-stall system aim is keeping the engine speed in an interval around this engine set speed. The engine set speed is dynamic, that is it is continuously updated throughout operation and adjusted depending on the operating parameters and/or operating variables. One aim of the engine set speed determination is to operate the engine at an optimal or near optimal position on the torque and/or power curve.

In one aspect of the disclosure, broadly described herein, a reactive block is disclosed that utilizes the engine set speed determination to prevent a stall. By establishing a threshold engine speed, the reactive block issues commands to adjust flow when the threshold engine speed is crossed to limit the occurrence of engine stall. The reactive block can comprise a PID control controlling the flow of the hydraulic pump. The flow of the hydraulic pump can be controlled by modifying the load sensing pressure of the hydraulic pump.

In another aspect of the disclosure, broadly described herein, a proactive block complements the reactive block, which may otherwise be too slow to stop a stall from occurring, by continuously and dynamically monitoring an estimate torque load on the engine against a torque curve and upon crossing a torque threshold issues a command to reduce flow. The torque threshold may be dynamically set. By this is understood, that the torque threshold may be varied depending on the operating parameters and operating variables. In this way, the proactive block does not rely upon engine speed as the indicator for issuing a command and provides the unique benefit of providing stability where the reactive block cannot. Conversely, the reactive block limits the use of the proactive block such that the flow of the hydraulic system is not needlessly reduced, which would otherwise reduce the power of the already limited low-power engine.

The proactive block may dynamically be limiting the rate of change of the torque load placed on the engine if the torque threshold is crossed. Limiting the rate of change of the torque load provides proactive stall prevention, as the increase of the load and thus the future load on the engine may be limited. More specifically, this proactive limiting avoids stalls of the engine by slowing down torque load increases when the system is operating close to the maximum torque load of the engine in its current operating conditions.

Another aspect of the present invention is the flow-sharing block that prioritizes and distributes the commanded flow to the machine so that higher priority functions continue even at reduced flow.

A further aspect of the disclosure, broadly described herein, is provided by the combination of the reactive block and proactive block that together prevent an engine stall except in select occurrences where an extremely rapid increase in pressure occurs. This is an advantage that is not possible in current single PID systems.

The reactive block alone is not enough to prevent engine stalls. The proactive block alone might limit the available torque more than necessary thereby reducing the performance of the work machine. The interplay of reactive and proactive block provides reliable stall prevention while at the same time allowing maximum utilization of the available torque and power. Additionally, the combination of reactive and proactive block reduces flow fluctuations in the hydraulic system, leading to a more stable system with better operator experience.

In yet another aspect of the disclosure, broadly described herein, an auxiliary block acts as a safety net or fail-safe for those extreme situations where a load acts on a machine more quickly than the reactive block and proactive block can effectuate a change in flow. The auxiliary block uses the pressure modification capabilities of a pump to issue a pump pressure command to the pump to reduce pressure. In this way a rapid response occurs and at worst a minimal load stall occurs, but an engine stall does not. To further limit the load stall, in an aspect of the present invention, a separate engine speed threshold is established for initiating the auxiliary block that is more tolerant than the reactive block.

The auxiliary block may comprise a PID control. The PID control may comprise different proportional (P) and/or integral (I) and/or derivative (D) settings as the PID control in the reactive block. The pump pressure command may be issued as a result of the PID control.

In another aspect of the invention the software and/or method of the disclosed anti-stall system can be a computer implemented method.

Another aspect of the invention is a computer readable medium comprising above mentioned software and/or computer implemented method.

This has outlined, rather broadly, the features, advantages, solutions, and benefits of the disclosure in order that the description that follows may be better understood. Additional features, advantages, solutions, and benefits of the disclosure will be described in the following. It should be appreciated by those skilled in the art that this disclosure may be readily utilized as a basis for modifying or designing other structures and related operations for carrying out the same purposes of the present disclosure. It should also be realized by those skilled in the art that such equivalent constructions and related operation do not depart from the teachings of the disclosure as set forth in the appended claims. The novel features, together with further objects and advantages, will be better understood from the following description when considered in connection with the accompanying Figures. It is to be expressly understood, however, that each of the Figures is provided for the purpose of illustration and description only and is not intended as a definition of the limits of the present disclosure.

DETAILED DESCRIPTION

Figure 1:
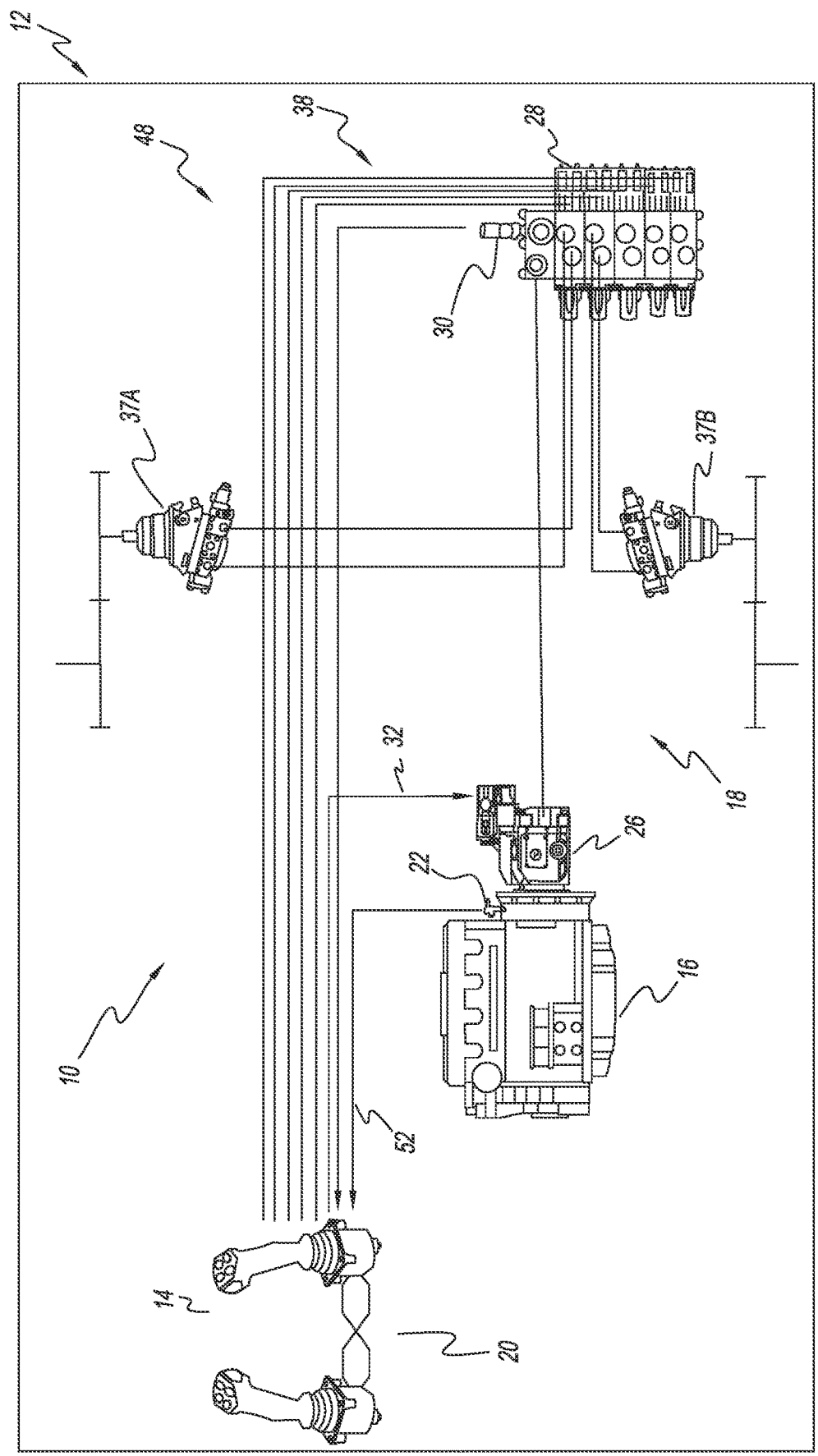
FIG. 1 is a schematic view of an anti-stall system in a work machine according to an aspect of the disclosure.

The disclosure described herein is directed to different aspects of an anti-stall system 10. The detailed description set forth below, in connection with the appended drawings, is intended as a description of various configurations and is not intended to represent the only configurations in which the concepts described herein may be practiced. These descriptions include specific details for the purpose of providing a thorough understanding of the various concepts. It will be apparent, however, to those skilled in the art that these concepts may be practiced without these specific details. In some instances, structures and components are shown in block diagram form in order to avoid obscuring such concepts.

The disclosure is described herein with reference to certain aspects, iterations, embodiments, and examples but it is understood that the disclosure can be embodied in many different forms and should not be construed as limited to the aspects set forth herein.

Although the terms first, second, etc. may be used herein to describe various elements or components, these elements or components should not be limited by these terms. These terms are only used to distinguish one element or component from another. Hence, a first element discussed herein could be termed a second element without departing from the teachings of the present application. It is understood that actual systems or fixtures embodying the disclosure can be arranged in many different ways with many more features and elements beyond what is shown in the drawings. For the same or similar elements or features, the same reference numbers may be used throughout the disclosure.

It is to be understood that when an element or component is referred to as being "on" another element or component, it can be directly on the other element or intervening elements may also be present. Furthermore, relative terms such as "between", "within", "below", and similar terms, may be used herein to describe a relationship of one element or component to another. It is understood that these terms are intended to encompass different orientations of the disclosure in addition to the orientation depicted in the figures.

Aspects of the disclosure may be described herein with reference to illustrations that are schematic illustrations. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region of a device and are not intended to limit the scope of the disclosure.

Figure 2:
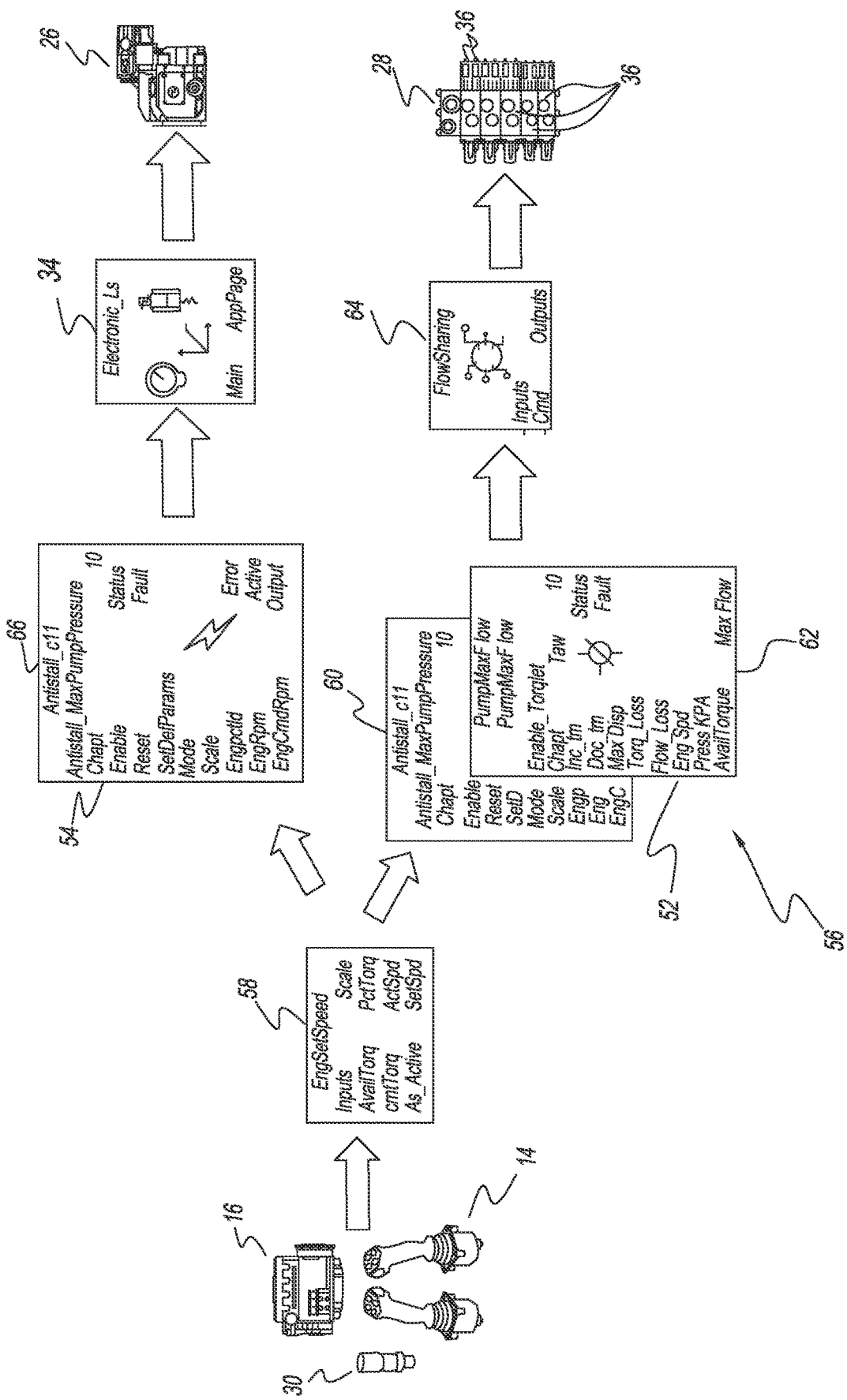
FIG. 2 is a schematic view of an anti-stall system according to an aspect of the disclosure.
Figure 3:
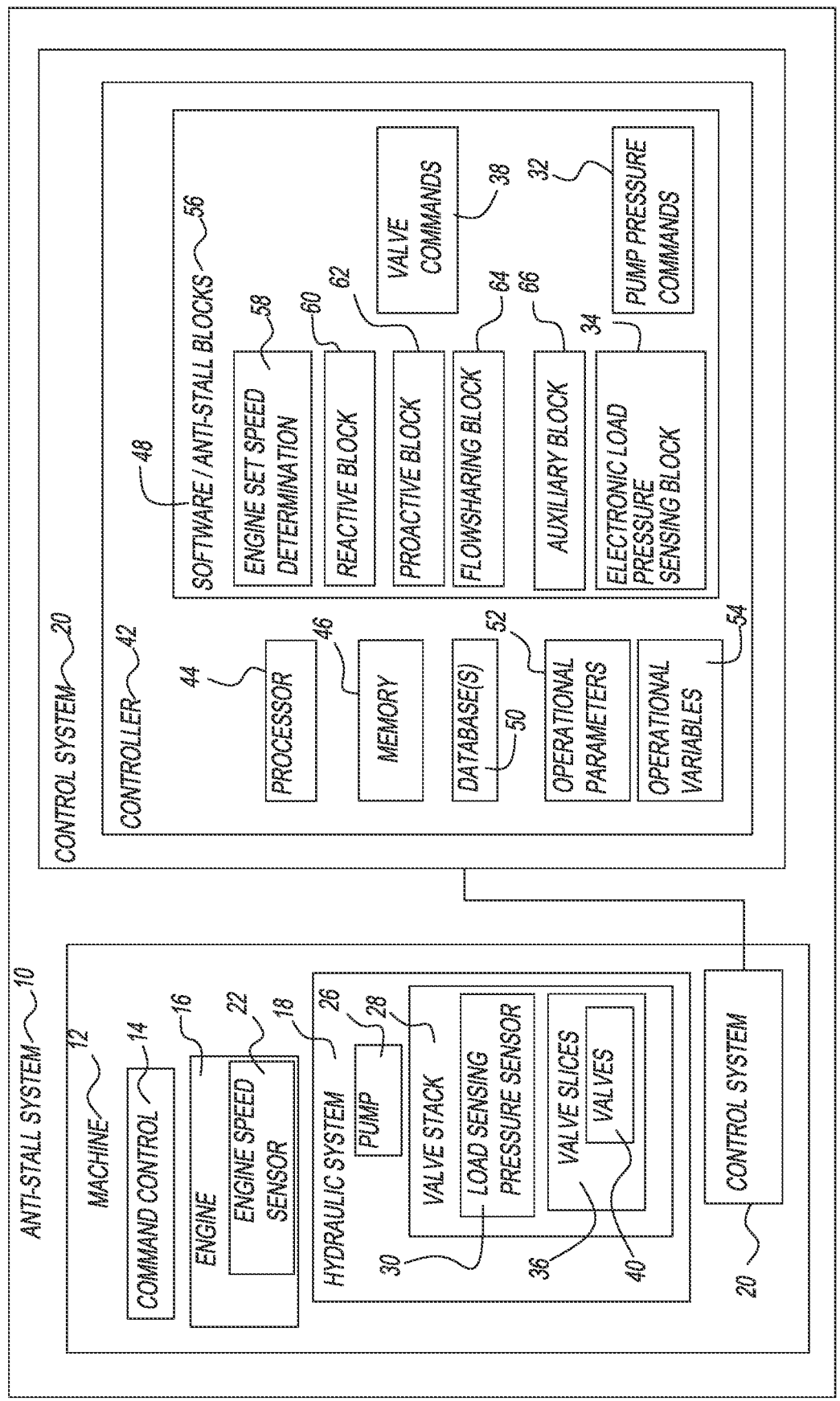
FIG. 3 is a schematic view of an anti-stall system according to an aspect of the disclosure.

With reference to the Figures aspects of an anti-stall system 10 are shown according to the disclosure. As depicted in FIG. 1-3, the anti-stall system 10 comprises a work machine 12 having a command control 14, an engine 16, a hydraulic system 18, and control system 20.

The present disclosure contemplates the work machine 12 being of any type, but in one aspect the work machine 12 is a skid loader that utilizes one or more joystick for the command control 14 to provide operator inputs to the control system 20 as disclosed further herein. In one aspect, the engine 16 is a low-powered engine 16—for instance a skid loader having 100 or less horsepower, which presents the unique need to maximize the power of the engine 16 during operation of the work machine 12. In another aspect, the engine 16 is fully mechanical and not electronic, which prevents the control system 20 from issuing commands directly to the engine 16 to alter the operation of the engine 16. In some aspects of the present invention, an engine speed sensor 22 configured to detect the operational speed of the engine 12 is connected to the engine 16 and in communication with the control system 20. In one aspect, the engine speed sensor 22 is configured to detect the rotations per minute (RPM) or equivalent operational variable of the work machine 12 and in particular aspects, the engine speed sensor determines RPM based on sensing a plurality of fly-wheel teeth 24 (not shown) of the engine 16. For purposes of clarification, the engine speed sensor 22 in an aspect of the present invention is distinguishable from a throttle sensor, which is configured to measure a relative position of the command control 14, which accordingly is not capable of detecting the speed (or RPM) of the engine 16.

In an aspect of the disclosure, the hydraulic system 18 comprises a pump 26 in mechanical communication with the engine 16 and hydraulic communication with a valve stack 28. In some aspects, the pump 26 is configured to load sensing. In some such aspects, the operation of the pump 26 is modified based on a pressure detected by a load sensing pressure sensor 30 connected to the valve stack 28 and in communication with the control system 20. The control system 20 is configured to receive the pressure detected by the load sensing pressure sensor 30 and issue a pump pressure command 32 to the pump 26 to alter operation. For example, the load sensing pressure 30 detects a pressure required by a load and based on the detected load, the control system 20 issues the pump pressure command 32 to the pump 26 to limit the load on the engine. In a further aspect, the pump pressure command 32 is issued to or through an electronic load pressure sensing block 34, which is configured to modify or set an effective margin of pressure for the pump 26.

The valve stack 28, in an aspect of the invention, comprises one or more valve slices (or directional control valve) 36 wherein each of the valve slices 36 is configured to effectuate one or more operator input from the command control 14. For exemplary purposes, a single valve slice 36 is configured to operate a right-hand motor 37A while another valve slice is configured to operate a left-hand motor 37B. Another valve slice 36 or pair of valve slices 36 are configured to operate a curl and dump of an attachment to the work machine 12, another valve slice 36 or pair of valve slices 36 are configured to raise and lower the attachment, and another valve slice 36 or pair of valve slices are configured to operate one or more auxiliary component of the work machine 12. In one aspect, the operation of the valve slice 36 is accomplished by the transmission of one or more valve commands 38 (e.g., PID control command) from the control system 20, wherein the valve commands 38 are configured to modify the position of one or more valves 40 of one or more valve slices 36 such as by way of opening, closing, constricting, expanding, and the like.

Figure 4:
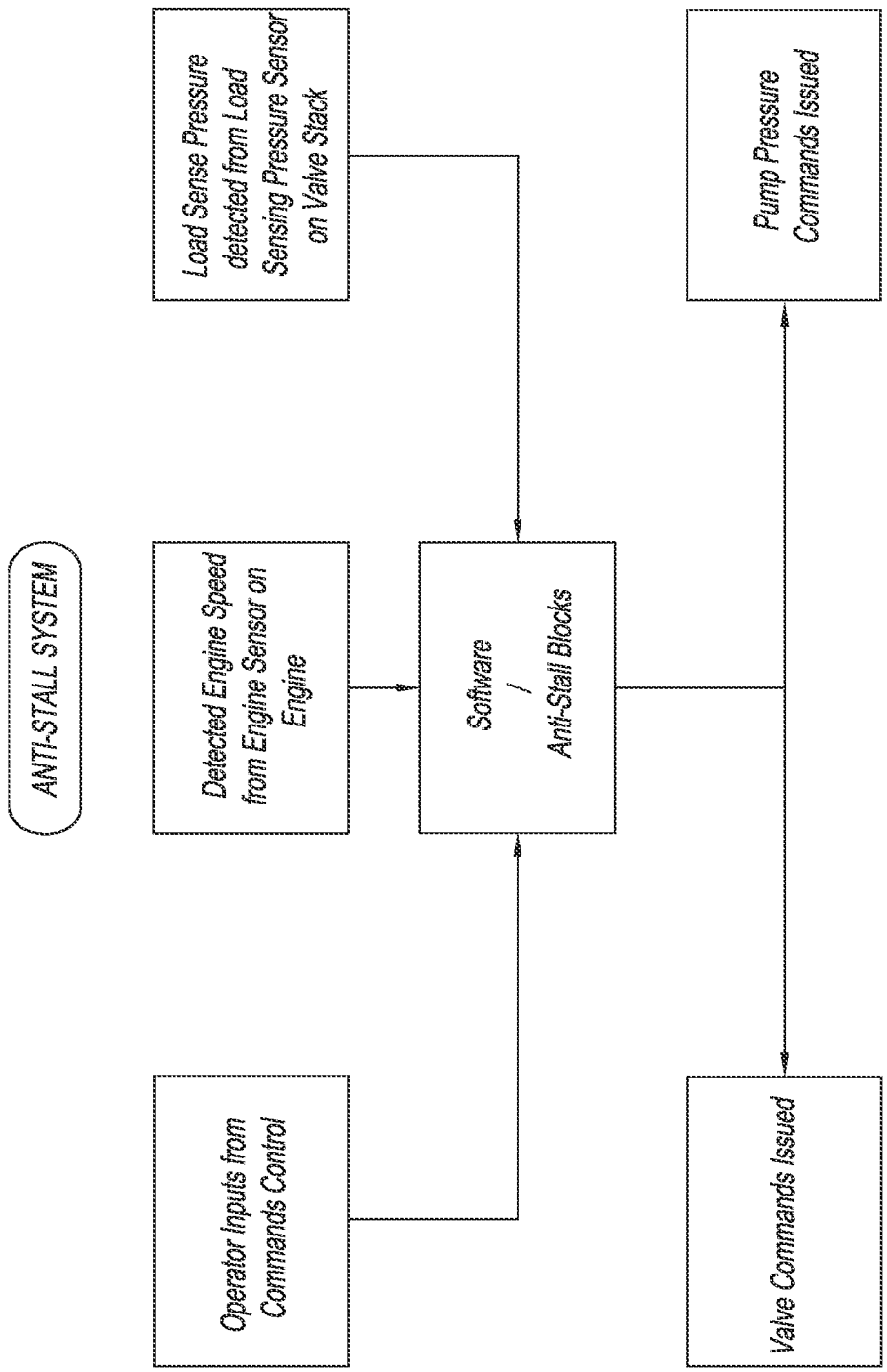
FIG. 4 is a flow diagram view of an anti-stall system according to an aspect of the disclosure.

With reference to FIGS. 3 and 4, aspects of the control system 20 are depicted. The control system 20 comprises a controller 42 having a processor 44 and a memory 46 accessible by the processor 44 that stores a software 48 configured to execute a series of instructions. The memory 46 is further configured to store one or more databases or libraries 50 containing one or more operational parameters 52 of the anti-stall system 10 as discussed further herein, including various thresholds. The processor 44 is configured to retrieve one or more operational parameters 52 and receive one or more operational variables 54 of the work machine 12, including operator inputs, engine speed, and load sensing pressure as discussed herein. Using the software 48, the processor 44 is configured to issue one or more pump commands 32 and valve commands 38.

As set forth more fully herein, the software 48 comprises a plurality of anti-stall blocks 56 configured to cooperatively and complementarily prevent a stall of the engine 18 by adjusting the flow and/or pressure of the hydraulic system 18 based on the operational parameters 52 and the operational variables 54 in a continuous and dynamic manner, such that modifications to the anti-stall system 10 occur in real-time or near-real time. In various aspects of the present invention, the anti-stall blocks 56, which comprise algorithms and/or a series of instructions carried out by the control system 20, comprise one or more of an engine set speed determination 58, a reactive block 60, a proactive block 62, a flow-sharing block 64, and an auxiliary block 66.

Figure 5:
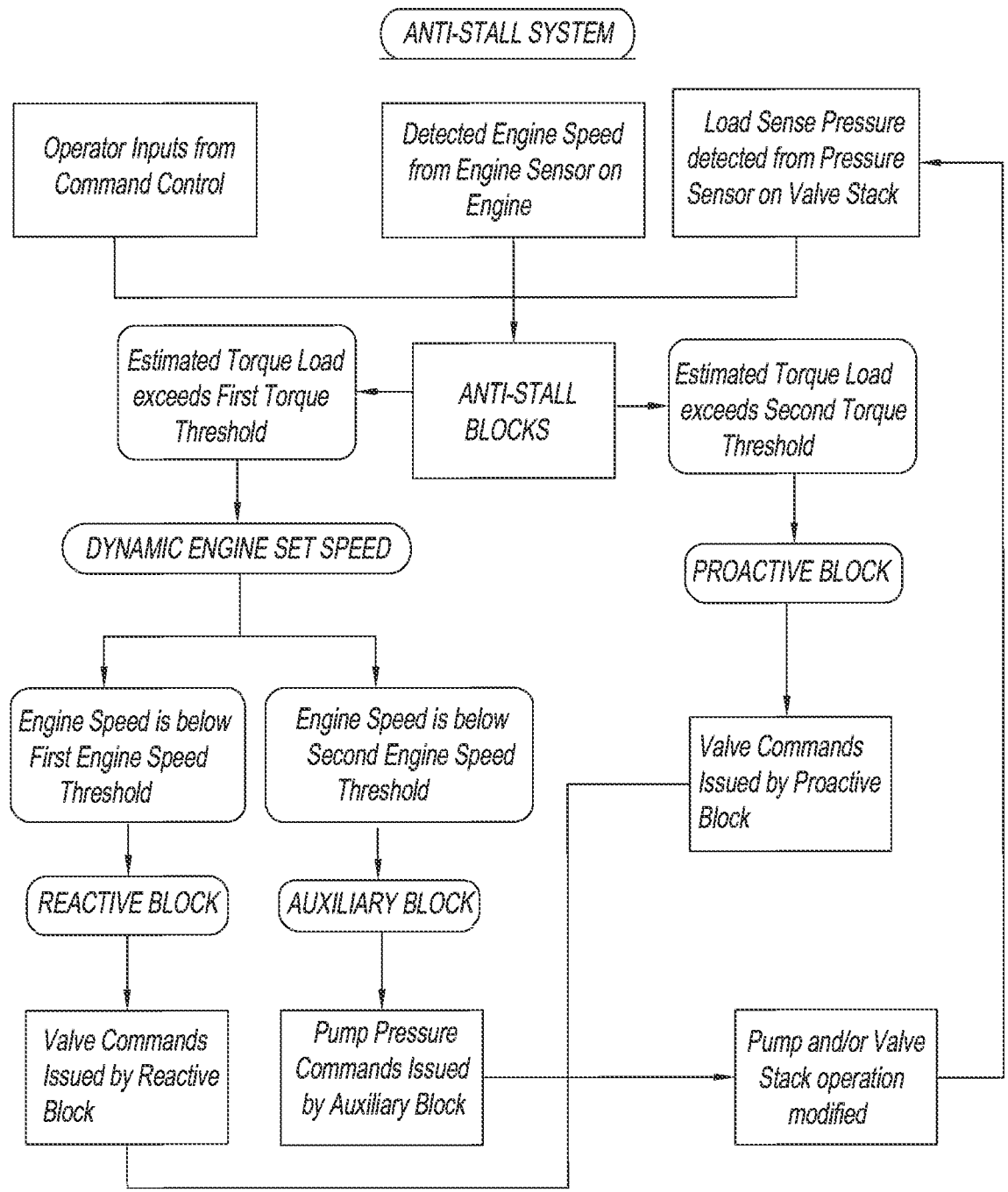
FIG. 5 is a flow diagram view of an anti-stall system according to an aspect of the disclosure.
Figure 6:
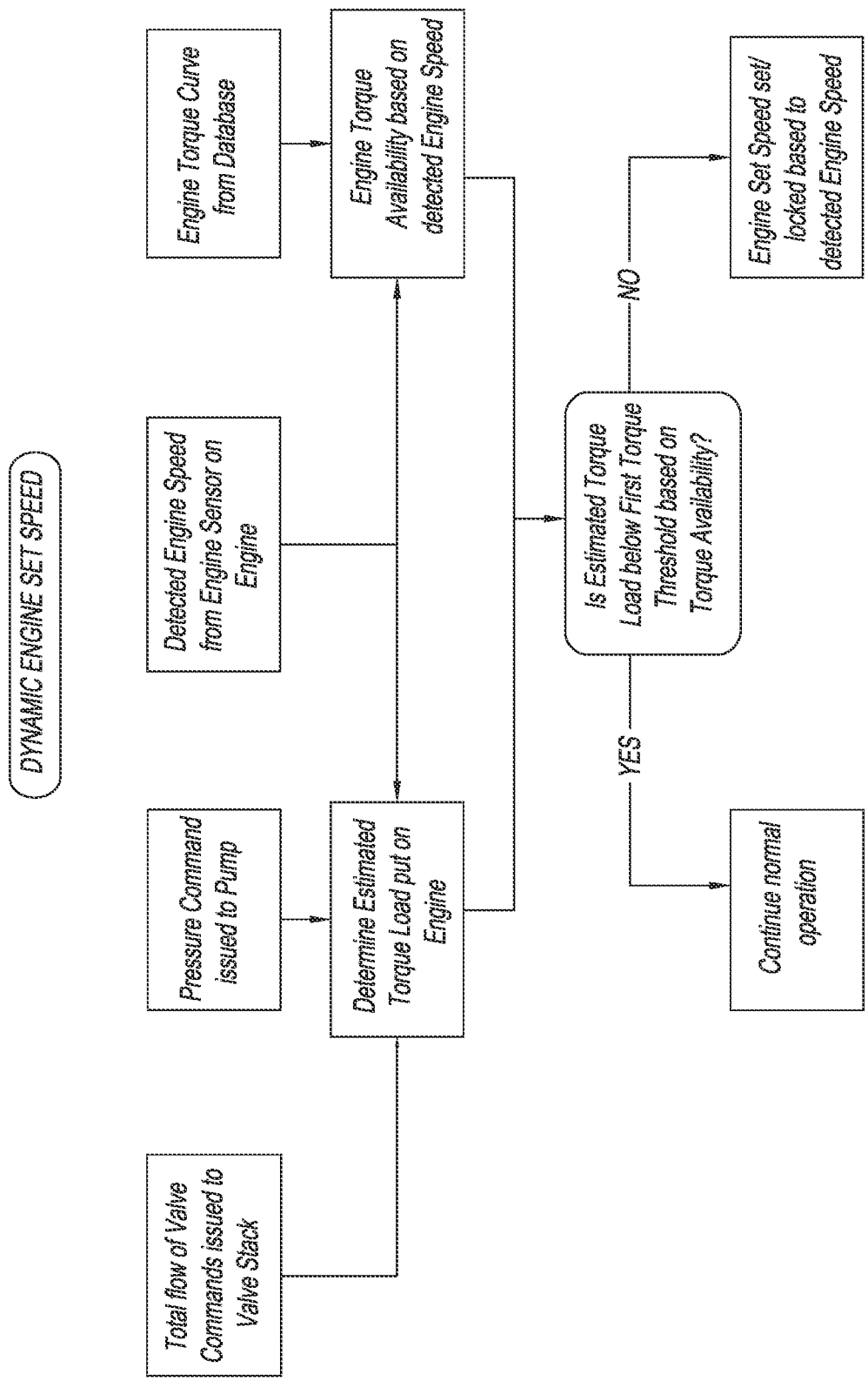
FIG. 6 is a flow diagram view of an anti-stall system according to an aspect of the disclosure.

With reference to FIGS. 4-6, aspects of the engine set speed determination 58 are shown. In one aspect, the engine set speed determination 58 is configured to monitor the engine speed of the engine 16 and determine an estimated torque load put on the engine 16, and upon detection that the estimated torque load exceeds a first torque threshold set or lock in an engine set speed. In a further aspect, the engine set speed determination 58 is configured to calculate the estimated torque load based upon operational variables 54 comprising the total flow of the hydraulic system 18, based on the pump commands 32 and the valve commands 38 currently being issued by the control system 20 (e.g., operator inputs from command control 14), as well as the currently detected engine speed from the engine speed sensor 22. The estimated torque load is compared to a torque curve stored in the database 50 of the memory 46 to determine whether the first torque threshold is exceeded based on an engine torque availability at the detected engine speed. Upon exceeding the first torque threshold, the engine set speed determination 58 determines the engine set speed that is used in other anti-stall blocks 56 as described further herein to adjust the flow and/or pressure of the hydraulic system 18. In one aspect of the present invention, the normal operation of the work machine 12 is maintained until the first torque threshold is exceeded, i.e., operator commands are passed through into pump commands 32 and the valve commands 38.

As an illustration, the engine set speed determination 58 may have the first torque threshold at 80% of available torque. The engine set speed determination 58 determines the engine torque availability at the currently detected engine speed. For example, at 2,000 RPM, the engine 16 may have a torque availability of 400 Nm, and accordingly the first torque threshold is determined to be 320 Nm. Upon encountering a load with the work machine 12, the pressure from the load acts on the work machine 12 increasing the torque demanded on the engine 18 above the first torque threshold. Upon exceeding the first torque threshold, the engine set speed determination 58 sets or locks the engine set speed to 2,000 RPM.

Notably, in one aspect of the present invention, the engine set speed input by the operator is unknown as operational variables 54 can cause the actual engine speed to differ from the set speed set by the operator. The engine set speed determination 58 is configured to estimate what the engine set speed is to overcome the unknown nature of the engine set speed input by the operator. Similarly, in another aspect of the present invention is not detecting a torque load on the engine 16 but rather determining an estimate torque load based on operational parameters 52 and operational variables 54.

Figure 7:
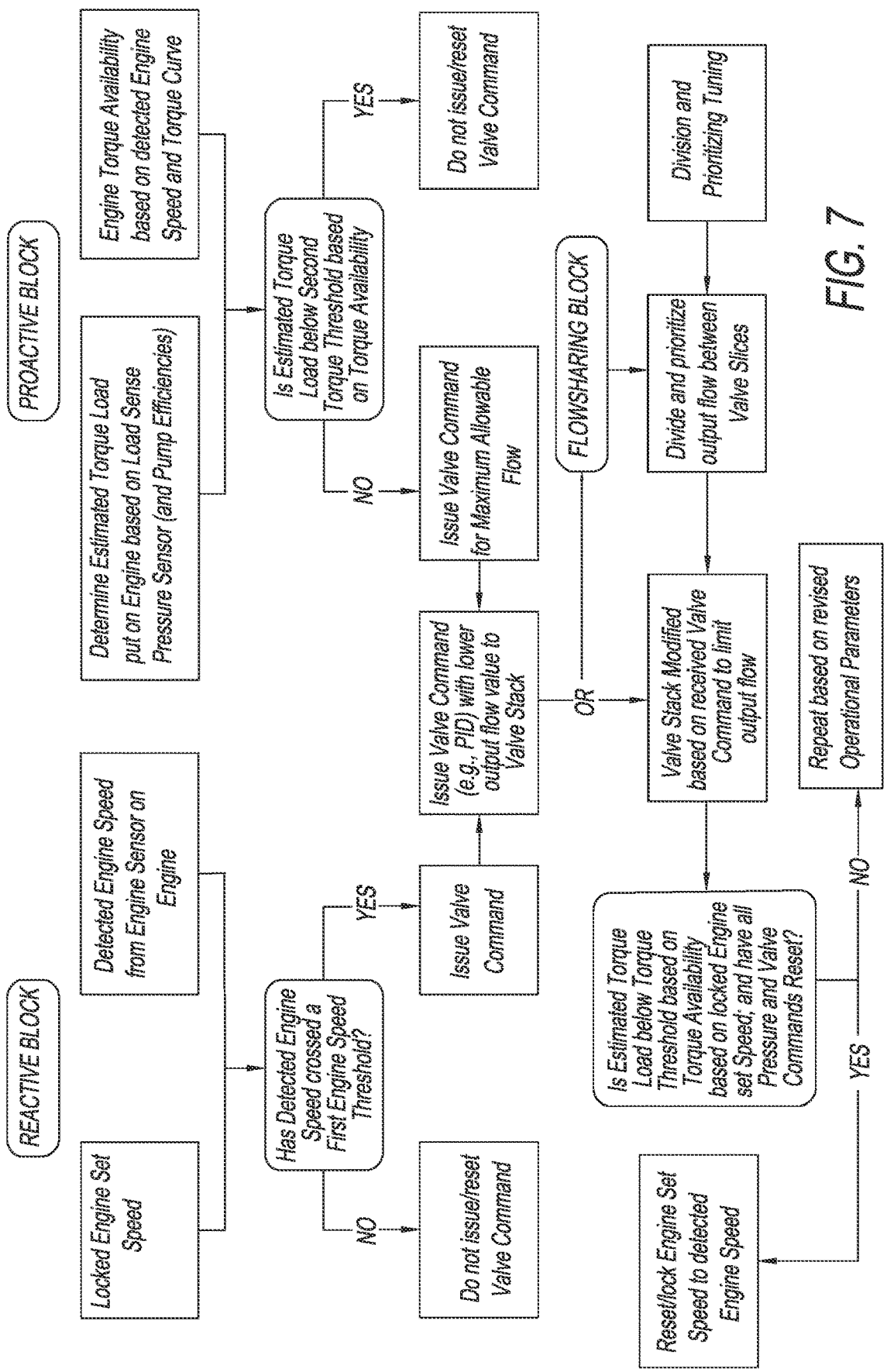
FIG. 7 is a flow diagram view of an anti-stall system according to an aspect of the disclosure.

With reference to FIGS. 4, 5, and 7, aspects of the reactive block 60 are shown. In one aspect, the reactive block 60 is configured to monitor the currently detected engine speed from the engine speed sensor 30. In another aspect, the reactive block 60 is configured to establish a first engine speed threshold (or retrieve the first engine speed threshold from the database 50) based on a defined engine droop below the engine set speed from the engine set speed determination 58. In yet a further aspect, the reactive block 60 is configured to compare the current engine speed to the first engine speed threshold to determine if the current engine speed has crossed the first engine speed threshold, i.e., an engine droop is occurring that could result in a stall of the engine 16. Upon determining the first engine speed threshold has been crossed, the reactive block 60 is configured to issue one or more valve commands 38 to reduce an output flow to the valve stack 28. In one aspect, the operator inputs pass through the reactive block 60 until the first engine speed threshold is crossed.

Further to the exemplary illustration, as the load is engaged by the work machine 12 and pressures increases, the speed of the engine 16 lowers or droops. Further to this example, the first engine speed threshold is set at a defined engine droop of 5% of the engine set speed (i.e., 100 RPM). Accordingly, upon the engine speed sensor 22 falling below 1,900 RPM, the reactive block 60 issues valve commands 38 to the valve stack 28 to counteract the increase in pressure in order to maintain the current torque and engine set speed.

While beneficial and useful, the reactionary nature of the reactive block 60, by itself, is not as effective in preventing the engine 16 from stalling when compared to using additional anti-stall blocks 56. This is due to engine speed falling to quickly for a response to be effectuate in time to prevent the stall. Additionally, by itself, the reactive block 60 can result in instability due to an overcorrection.

In another aspect of the present invention, the proactive block 62 complements and cooperates with the reactive block 60. The proactive block 62, in one aspect, is configured to determine a maximum allowable flow or second torque threshold that can be instructed to the valve stack 28 based upon operational parameters 52 and current operational variables 54. The proactive block 62 in another aspect is configured to estimate an estimated torque load based upon current operational variables 55 and using operational parameters 52 to establish the second torque threshold. In particular aspects, the proactive block 62 is configured in a similar fashion as the engine set speed determination 58 as the proactive block 62 determines an estimated torque load based upon the current sensed pressure and sensed engine speed (as well as pump efficiencies when available) and compares the estimated torque load against the torque curve to establish the second torque threshold that can be the same or different from the first torque threshold. Upon the second torque threshold being crossed, the proactive block 62 is configured to issue one or more valve command 38 to reduce an output flow to the valve stack 28 to the determined maximum allowable flow. In one aspect, the operator inputs pass through the proactive block 62 until the second torque threshold is crossed.

Returning to the exemplary illustration, the proactive block 62 may also establish the second torque threshold at 80% of available torque. Using the previously defined operational parameters 52 (e.g., torque curve having predefined torque availability at a predefined engine speed) and operational variables 54 (e.g., RPM), the second torque threshold is determined to be 320 Nm. Upon encountering the load, the torque demanded on the engine 18 rises above the second torque threshold. Upon exceeding the second torque threshold, the proactive block 62 determines the maximum allowable flow under the current operational variables 54 in conjunction with the operational parameters 52, which is used to issue one or more valve commands 38 to the valve stack 28 to limit output flow to the maximum allowable rate.

Accordingly, the proactive block 62 differs from the reactive block 60 in that the proactive block 62 is configured to issue valve commands 38 based on available torque, whereas the reactive block 60 compares engine speed to an engine set speed. This configuration of the proactive block 62 provides the proactive block 62 with providing a response based on the torque curve proactively rather than waiting for the increased torque causing engine speed to reduce as is the circumstance with the reactive block 60.

By itself, the proactive block 62 is useful in providing stable operation of the work machine 12. However, being proactive can lead to inefficiencies and reduced productivity as a result of power being unnecessarily reduced by flow reduction. This is particularly true with respect to lower-power engines that have limited horsepower and any reduction in power can result in significant reduction in productivity. The cooperative and complementary configuration of the reactive block 60 and the proactive block 62 reduce and/or eliminate the inefficiencies each has independent thereby providing an anti-stall system 10 that prevents a stall in the majority of instance while providing a stable and efficient operation of the work machine 12.

A further aspect of the present invention arises in instances where both the reactive block 60 and the proactive block 62 issue a valve command 38 to the valve stack 28. In such instances, the anti-stall blocks 56 are configured to issue the valve command 38 with the lowest command output flow, which based on the present disclosure is apparent due to the adjustments in flow being directed at altering the operational variables 54 to within determined thresholds. Otherwise, if only one valve command 38 is issued, then that valve command 38 is commanded to the valve stack 28 to reduce output flow.

Still with reference to FIGS. 4, 5, and 7, aspects of the flow-sharing block 64 are shown. In one aspect, the flow-sharing block 64 is configured to divide the flow between the valve slices 36 of the valve stack 28. For example, when a valve command 38 is received from the proactive valve 62 to limit flow to the maximum allowable flow, the flow-sharing block 64 divides and prioritizes the modified flow to prioritize various functions of the machine. The flow-sharing block 64, in another aspect, divides and prioritizes the flow commanded by the reactive block 60. In some aspects, the flow-sharing block 64 is modifiable to tune the division and prioritization of flow to the valve slices 36. In particular aspects of the present invention, the flow-sharing block 64 is absent or bypassed when the operator inputs otherwise pass through the anti-stall blocks 56.

Figure 8:
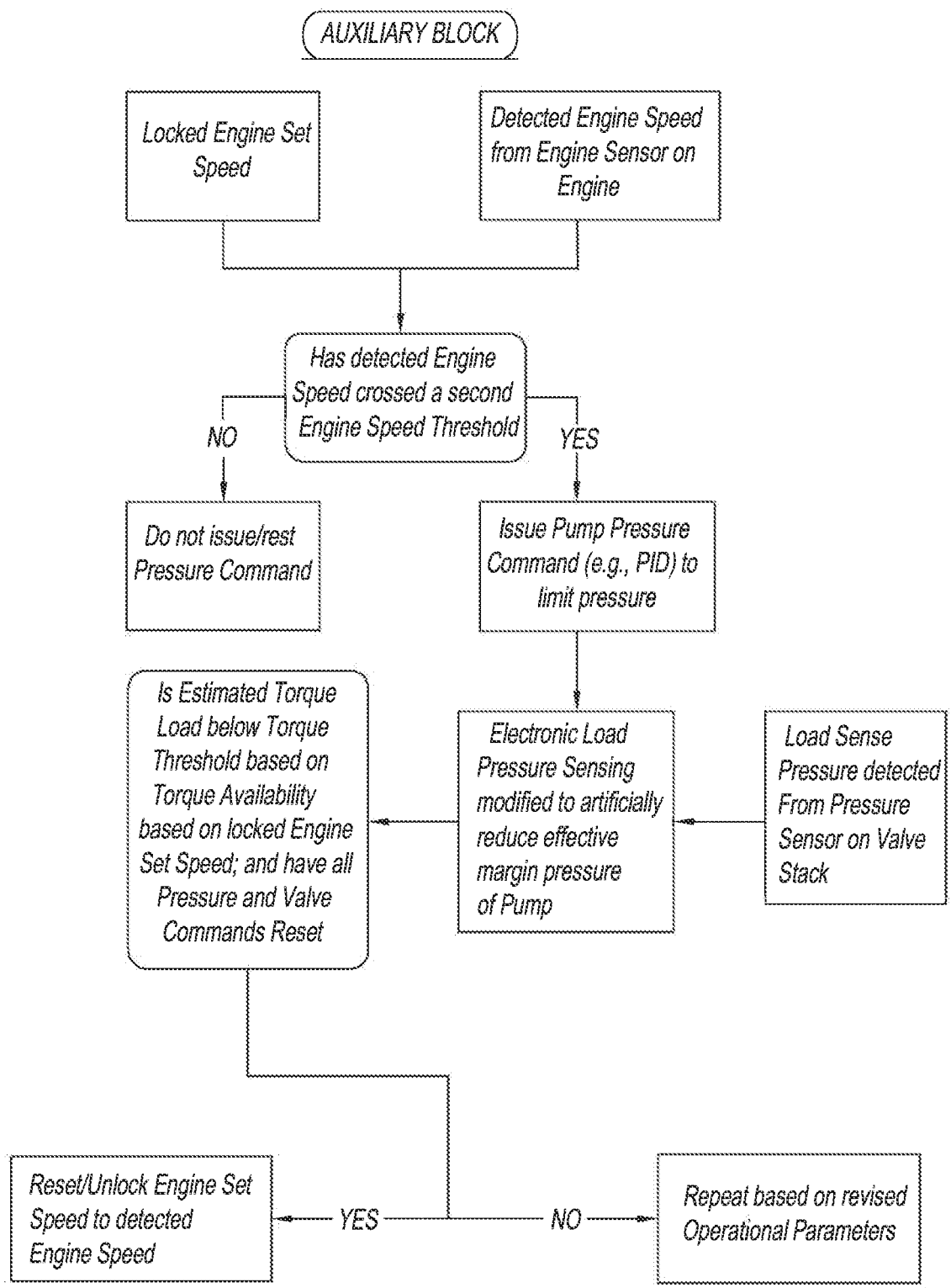
FIG. 8 is a flow diagram view of an anti-stall system according to an aspect of the disclosure.

With reference to FIGS. 4, 5, and 8, aspects of the auxiliary block 66 are depicted. In one aspect, the auxiliary block 66 is configured to monitor the currently detected engine speed from the engine speed sensor 30. In a further aspect, the auxiliary block 66 is configured to establish a second engine speed threshold (or retrieve the second engine speed threshold from the database 50) based on the engine set speed from the engine set speed determination 58. Notably, in some aspects, the second engine speed threshold is greater than that of the first engine speed threshold, i.e., a larger disparity or droop between the current engine speed and the engine set speed must occur to cross the second engine speed threshold. In yet another aspect, the auxiliary block 66 is configured to compare the current engine speed to the second engine speed threshold to determine if the current engine speed has crossed the second engine speed threshold. Upon determining the second engine speed threshold has been crossed, the auxiliary block 66 is configured to issue one or more pump pressure command 32 to reduce the pressure provided by the pump 26. In certain aspects, the auxiliary block 66 issues the pump pressure command 32 to the electronic load pressure sensing block 34 to artificially reduce or modify the effective margin of pressure for the pump 26, thereby resulting in the pump 26 reducing pressure. In further aspects, the pump pressure command 32 is determined, in part, by the current pressure sensed by the load sensing pressure sensor 30.

Returning to a modified version of exemplary illustration, the work machine 12 engages a load that results in a rapid increase in pressure and reduction in engine speed. An example of such a condition might be a skid loader 12 which drives into a pile of material to load. Furthermore to this example, the second engine speed threshold is set at a droop of 10% of engine set speed (i.e., 200 RPM). As the increase may be near instantaneous and readily surpassing the first engine speed threshold of 5% and the ability of the valve stack 28 to reduce flow in time to prevent a stall of the engine 16, the auxiliary block 66 issues a pump pressure command 32 to the pump 26. As the pump 26 can reduce pressure more quickly than the valve stack 28 can reduce flow, the stall of the engine 16 is prevented.

While useful as a cooperative fail-safe of the anti-stall blocks 56, the reduction in pressure created by the pump 26 causes a load stall. However, the auxiliary block 56 is configured to maintain the reduction in pressure only to the point in time necessary for the reactive block 60 and/or proactive block 62 to modify the flow via the valve stack 28. By utilizing a higher threshold for the second engine speed threshold, the use of the auxiliary block 66 is limited to likewise limit the number and duration of load stalls created by the auxiliary block.

With reference to FIGS. 7 and 8, additional aspects of the anti-stall system 10 are shown. Once one or more of the anti-stall blocks 56 is operational (engine set speed set, valve command issued, and/or pump pressure command issued), the control system 20 is configured to maintain engine set speed until the current estimated torque load is within the current torque threshold and all pump pressure commands 32 and valve commands 38 have reset. Until this time, the anti-stall system 10 continuously and dynamically issues pump pressure commands 32 and valve commands 38 to prevent a stall of the engine 16. Once the current estimated torque load is within the current torque threshold and all pump pressure commands 32 and valve commands 38 have reset, the engine set speed is reset to the currently detected engine speed, which is some aspects of the present invention is delayed for a predefined period of time.

For a firmware and/or software implementation, the methodologies may be implemented with modules (e.g., procedures, functions, routines and so on) that perform the functions described herein. A machine-readable medium tangibly embodying instructions may be used in implementing the methodologies described herein. For example, software codes may be stored in the memory 46 and executed by a processor 44. Memory 46 may be implemented within the processor 44 or external to the processor 44. As used herein, the term "memory" 46 refers to types of long term, short term, volatile, nonvolatile, or other memory and is not to be limited to a particular type of memory or number of memories, or type of media upon which memory is stored. If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage, solid state or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, and steps have been described above generally in terms of their functionality. Whether such functionality or configuration is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, and modules where described in connection with the disclosure herein may be implemented or performed with a general-purpose processor (i.e., processor 44), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, solid state storage, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. In yet other aspects, the processor can be remote to the storage medium and accesses the storage medium through a linked connection.

In one or more exemplary designs or iterations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, solid state, or any other medium that can be used to carry or store specified program code means in the form of instructions or data structures and that can be accessed by a general-purpose or special-purpose computer, or a general-purpose or special purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In the present disclosure, the processor 44 may serve as a structure for computer-implemented functions as described herein because the function(s) described in one or more aspects of the present disclosure are coextensive with the processor itself. Further, such a processor may serve as structure for functions that may be achieved by a general-purpose computer without special programming, because the coextensive functions include receiving data, storing data, processing data, etc. Further, the present disclosure is removed from the abstract and does not merely limit the use of an abstract idea to a particular technological environment. The present disclosure expands basic building blocks beyond the mere sum of the parts, at least for the reason that the present disclosure provides faster, more consistent, and more reliable results than obtainable with current methods and devices.

Therefore, an anti-stall system 10 has been provided in various aspects that prevents an engine stall to occur due to a reaction to the load that a hydraulic system is capable of overcoming; utilizes multiple valve and pressure pump commands to prevent a stall; modifies output flow and pressure to prevent a stall; prevents a stall both proactively and reactively; prevents engine stall, not simply limits engine stall occurrence; increases machine performance, productivity, efficiency, and stability; results in easier machine operation, and improves upon the art.

From the above discussion and accompanying figures and claims it will be appreciated that the anti-stall system 10 offers many advantages over the prior art. Although the present disclosure and its advantages have been described in detail, it should be understood that various changes, substitutions, modifications, and alterations can be made herein without departing from the technology of the disclosure as defined by the appended claims. The scope of the present application is not intended to be limited to the particular configurations of the process, machine, manufacture, composition of matter, means, methods and steps described in the specification only expressly stated otherwise. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

What is claimed is:

1. An anti-stall system, comprising:
a work machine having an engine with an engine speed sensor, a hydraulic system, a command control, and a control system;
the hydraulic system comprising a pump and a valve stack having a pressure sensor;
the control system comprising:
a reactive block configured to issue a first command to the valve stack of the hydraulic system based on a first engine speed threshold being crossed, wherein the first engine speed threshold is based on a defined engine droop; and
a proactive block configured to issue a second valve command to the valve stack of the hydraulic system based upon a first torque threshold being crossed.

2. The anti-stall system of claim 1 wherein the control system further comprises an engine set speed determination configured to set an engine set speed at a current engine speed when an estimated torque load put on the engine based on operational variables of the work machine crosses a second torque threshold based on operational parameters of the anti-stall system.

3. The anti-stall system of claim 2 wherein the operational variables of the work machine comprise a total flow of the hydraulic system, a pressure of the hydraulic system, and a detected engine speed by the engine speed sensor.

4. The anti-stall system of claim 2 wherein the operational parameters of the anti-stall system comprise a torque curved stored in a database of the control system, wherein the torque curve provides a predefined torque availability of the engine at a predefined engine speed.

5. The anti-stall system of claim 2 wherein the first engine speed threshold is crossed when the current engine speed falls below the defined engine droop.

6. The anti-stall system of claim 1 wherein the first torque threshold is based on a current estimated torque load put on the engine based on operational variables of the work machine and at least one operational parameter of the anti-stall system.

7. The anti-stall system of claim 6 wherein the operational variables of the work machine comprise a total flow of the hydraulic system, a current pressure of the hydraulic system, and a detected engine speed by the engine speed sensor; and the at least one operational parameter of the anti-stall system comprises a torque curve.

8. The anti-stall system of claim 7 wherein the operational variables of the work machine further comprise a pump efficiency.

9. The anti-stall system of claim 1 wherein the second valve command is a calculated maximum allowable flow that can be commanded to the valve stack of the hydraulic system based on an operator input from the command control to the control system for a plurality of functions of the work machine.

10. The anti-stall system of claim 1 wherein the control system is configured to issue a lowest command output flow of the first valve command and the second valve command to the hydraulic system.

11. The anti-stall system of claim 1 wherein the control system further comprises a flow-sharing block configured to divide and prioritize a flow commanded by the control system between a plurality of valve slices of the valve stack.

12. The anti-stall system of claim 11 wherein the flow-sharing block is configured to be tunable such that a division and prioritization of the flow is modifiable.

13. The anti-stall system of claim 1 wherein the control system further comprises an auxiliary block configured to issue a pump pressure command to the hydraulic system to reduce a pressure created by the pump based upon a second engine speed threshold being crossed.

14. The anti-stall system of claim 13 wherein the second engine speed threshold is based on the defined engine droop and an engine set speed that is greater than the first engine speed threshold, and the second engine speed threshold is crossed when a current engine speed falls below the defined engine droop.

15. The anti-stall system of claim 13 wherein the pump pressure command is issued to an electronic load pressure sensing block to artificially reduce an effective margin of pressure for the pump.

16. The anti-stall system of claim 2 wherein the control system is configured to reset the engine set speed when the second torque threshold is no longer crossed, the reactive block is no longer issuing the first valve command, the proactive block is no longer issuing the second valve command, and an auxiliary block is no longer issuing a pump pressure command.

17. The anti-stall system of claim 1 wherein an engine set speed determination of the control system is configured to continuously and dynamically determine whether to set an engine set speed at a current engine speed; the reactive block is configured to continuously and dynamically determine whether to issue the first valve command, the proactive block is configured to continuously and dynamically determine whether to issue the second valve command, and an auxiliary block of the control system is configured to continuously and dynamically determine whether to issue a pump pressure command, such that the control system is configured to continuously and dynamically prevent the engine from stalling.

18. An anti-stall system, comprising:
a work machine having an engine with an engine speed sensor, a hydraulic system, a command control, and a control system;
the hydraulic system comprising a pump and a valve stack having a pressure sensor;
the control system comprising:
a proactive block configured to issue a first valve command to the hydraulic system based upon a first torque threshold being crossed, wherein the first torque threshold is below a current estimated torque load put on the engine based on operational parameters of the anti-stall system and operational variables of the work machine.

19. The anti-stall system of claim 18 wherein the operational variables of the work machine comprise a total flow of the hydraulic system, a current pressure of the hydraulic system, and a detected engine speed by the engine speed sensor, and the operational parameters of the anti-stall system comprise a torque curve.

20. The anti-stall system of claim 18 wherein the first valve command is a calculated maximum allowable flow that can be commanded to the valve stack of the hydraulic system based on an operator input from the command control to the control system for a plurality of functions of the work machine.

21. An anti-stall system, comprising:
a work machine having an engine with an engine speed sensor, a hydraulic system, a command control, and a control system;
the hydraulic system comprising a pump and a valve stack having a pressure sensor;
the control system comprising:
an engine set speed determination configured to set an engine speed at a current engine speed when an estimated torque load put on the engine based on operational variables of the work machine, crosses a torque threshold based on operational parameters of the anti-stall system,
wherein the operational variables of the work machine comprise a total flow of the hydraulic system, a pressure of the hydraulic system, and a detected engine speed by the engine speed sensor, and the operational parameters of the anti-stall system comprise a torque curve stored in a database of the control system; and
wherein the torque curve provides a predefined torque availability of the engine at a predefined engine speed.

* * * * *